United States Patent
Maeda et al.

(10) Patent No.: US 8,940,921 B2
(45) Date of Patent: Jan. 27, 2015

(54) METHOD FOR PRODUCING FATTY ACID ALKYL ESTER AND PRODUCTION SYSTEM THEREFOR

(75) Inventors: Yasuaki Maeda, Sakai (JP); Hiroshi Bandow, Sakai (JP); Norimichi Takenaka, Sakai (JP); Yasuhiro Sadanaga, Sakai (JP); Kenji Okitsu, Sakai (JP)

(73) Assignee: Osaka Prefecture University Public Corporation, Sakai-shi (JP)

( * ) Notice: Subject to any disclaimer, the term of this patent is extended or adjusted under 35 U.S.C. 154(b) by 808 days.

(21) Appl. No.: 13/254,546

(22) PCT Filed: Mar. 14, 2010

(86) PCT No.: PCT/JP2010/054265
§ 371 (c)(1),
(2), (4) Date: Sep. 2, 2011

(87) PCT Pub. No.: WO2010/106985
PCT Pub. Date: Sep. 23, 2010

(65) Prior Publication Data
US 2011/0319651 A1    Dec. 29, 2011

(30) Foreign Application Priority Data
Mar. 16, 2009  (JP) ................................. 2009-062252

(51) Int. Cl.
C11C 3/10 (2006.01)
C10L 1/02 (2006.01)
C10L 1/08 (2006.01)
C11C 3/00 (2006.01)
C11B 13/00 (2006.01)

(52) U.S. Cl.
CPC .............. C11C 3/003 (2013.01); C10L 1/026 (2013.01); C11B 13/00 (2013.01); C10G 2300/1014 (2013.01); Y02E 50/13 (2013.01); C10G 2300/44 (2013.01)
USPC ......................................................... 560/129

(58) Field of Classification Search
CPC .......... C11C 3/003; C10L 2/026; C11B 12/00
USPC ......................................................... 560/129
See application file for complete search history.

(56) References Cited

FOREIGN PATENT DOCUMENTS

| JP | 62-218495 | 9/1987 |
| JP | 7-197047 | 8/1995 |
| JP | 2004-156022 | 6/2004 |
| JP | 2009-040979 | 2/2009 |

OTHER PUBLICATIONS

F. Abreu, et al.; "Utilization of metal complexes as catalysts in the transesterification of Brazilian vegetable oils with different alcohols;" Journal of Molecular Catalysis A: Chemical; vol. 209; 2004; pp. 29-33.
International Search Report for International Application No. PCT/JP2010/054265 dated Mar. 24, 2010.
Notification of First Office Action issued Oct. 29, 2012 in counterpart application No. 201080012490.7 with English translation (11 pages).

*Primary Examiner* — Yevegeny Valenrod
(74) *Attorney, Agent, or Firm* — Kratz, Quintos & Hanson, LLP

(57) ABSTRACT

[Problem] There are provided a method for production of a fatty acid alkyl ester and a system therefor, in which a high yield of the fatty acid alkyl ester is achieved even without using any special equipment and separation of a fatty acid alkyl ester phase from a glycerin phase can be carried out within an extremely short period of time.
[Means to solve] The method for producing a fatty acid alkyl ester of the present invention comprises subjecting a starting oil to an ester exchange reaction with a lower alkyl alcohol in the presence of a catalyst to generate the fatty acid alkyl ester, wherein the ester exchange reaction step is carried out in a homogeneous phase system by adding an organic solvent selected from acetone, isopropanol and a mixture thereof to a reaction system.

8 Claims, 3 Drawing Sheets

METHOD FOR PRODUCING FATTY ACID ALKYL ESTER AND PRODUCTION SYSTEM THEREFOR

TECHNICAL FIELD

The present invention relates to a novel production method and a production system therefor for efficiently producing a fatty acid alkyl ester to be used for a biodiesel fuel at a high production rate at low cost.

BACKGROUND ART

Recently there are movements for introducing biodiesel fuels (BDF) produced using, as a starting material, oils derived from vegetable oils such as palm oil from the viewpoint of prevention of global warming and circulation of resources. Also, from the viewpoint of protection of environment, trials to use, as fuels for diesel engine, fuels prepared using waste food oils after the use for cooking and trap grease (sludge-like oils and fats floating on a surface of waste water) have been made.

Biodiesel fuels are prepared by ester exchange reaction of monoglyceride, diglyceride and triglyceride, which are main components of oils and fats, with a lower alkyl alcohol such as methanol and ethanol. For example, an alkali catalyst method, in which oils and fats are subjected to ester exchange with a lower alkyl alcohol such as methanol in the presence of an alkaline catalyst such as NaOH or KOH, has been proposed (for example, cf. Patent Document 1)). In such a method, glycerin amounting to about 10% to 20% of starting oils and fats is generated as a by-product.

However, in this method, since the ester exchange reaction is carried out for about one day with stirring under heating, there is a problem that the production cost thereof becomes high. In addition, because an alkaline catalyst is used, a reaction proceeds between glycerin and the alkaline catalyst and soap is generated. If soap is generated, it takes time, i.e., about one day to separate a biodiesel fuel from glycerin. Further, once soap is generated, it is necessary to waste glycerin and soap which are intrinsically valuable as a commercial product. As a result, a new environmental problem arises.

In order to solve such a problem, the inventors of the present invention have proposed the method of separating a biodiesel fuel from glycerin by carrying out an ester exchange reaction with stirring using ultrasonic waves (for example, cf. Patent Document 2)). This method is characterized in that the reaction time is as short as five hours as compared with conventional methods, the reaction advances even with a small amount of a catalyst to be added, there is no need of applying heat in the ester exchange reaction, and soap is hardly generated.

However, in this method, equipment for stirring and separating with ultrasonic waves is necessary. Also, there is a problem that for stirring and separating with ultrasonic waves, higher production cost is required. Further, the separation time is as short as one hour as compared with conventional methods. However, a problem with generation of soap during the one-hour separation remains unsolved. Therefore, there is a problem that high quality glycerin cannot be obtained.

In order to solve such a problem, trials for adding a solvent to a reaction system and carrying out the reaction in a homogeneous phase system have been made (for example, cf. Patent Document 3)). In the method described in this document, dimethyl ether is added to a reaction system, thereby greatly improving the speed of the ester exchange reaction, and efficiently carrying out the ester exchange.

However, by the use of dimethyl ether, a lower alkyl alcohol as a reactant is easily dissolved in the generated glycerin, thereby causing a problem that the proceeding of the reaction is hindered, i.e., yield of a fatty acid alkyl ester becomes low. Also, since the lower alkyl alcohol is dissolved in either of the fatty acid alkyl ester phase and the glycerin phase, there is a problem that it takes a time to separate the fatty acid alkyl ester phase containing the fatty acid alkyl ester, lower alkyl alcohol and organic solvent from the glycerin phase. If it takes time to separate the fatty acid alkyl ester phase from the glycerin phase, soap is generated, resulting in a problem with a production cost. Also, because an unreacted lower alkyl alcohol is dissolved in the glycerin phase, it is necessary to extract the unreacted lower alkyl alcohol from the recovered glycerin. Dimethyl ether is an organic solvent which is not dissolved in water. Therefore, if water is contained in the reaction system, there is a problem that the reaction does not advance. Further, a boiling point of dimethyl ether is as very low as −23.6° C. Therefore, in order to let dimethyl ether remain in the reaction system, it is necessary to use special equipment such as a pressure cell.

Patent Document 1: JP-A-7-197047
Patent Document 2: JP-A-2004-156022
Patent Document 3: JP-A-2009-40979

DISCLOSURE OF INVENTION

Problem to be Solved by the Invention

Namely, the present invention was made in the light of the above-mentioned problems, and the object of the present invention is to provide a method and system for production of a fatty acid alkyl ester, in which a high yield of the fatty acid alkyl ester is achieved even without using any special equipment and separation of a fatty acid alkyl ester phase from a glycerin phase can be carried out within an extremely short period of time.

Means to Solve the Problem

The inventors of the present invention have investigated a solvent to be used for an ester exchange reaction in a homogeneous phase system, and have found a production method for producing a fatty acid alkyl ester, in which dissolution of methanol in glycerin is inhibited, and in addition, yield of a fatty acid alkyl ester is high and separation of a fatty acid alkyl ester phase from a glycerin phase can be carried out within an extremely short period of time, and thus, have completed the present invention. Namely, the present invention is as explained below.

The method of the present invention for producing a fatty acid alkyl ester is a method of subjecting a starting oil to an ester exchange reaction with a lower alkyl alcohol in the presence of a catalyst. The ester exchange reaction step is carried out by adding an organic solvent selected from acetone, isopropanol and a mixture thereof to a reaction system and the reaction is conducted in a homogeneous phase system. These organic solvents are organic solvents having a boiling point being higher than a normal temperature, i.e., these solvents are liquids at a normal temperature. Accordingly, these solvents remain in the reaction system even if the ester exchange reaction is carried out at a normal temperature. As a result, the ester exchange reaction can be carried out without using special equipment.

In the present invention, acetone and isopropanol are organic solvents having a density at 25° C. of not more than 800 kg/m³. A density of glycerin is 1,260 kg/m³, and a density of the fatty acid alkyl ester to be generated is close to 1 kg/m³. Accordingly, when the organic solvent having a density at 25° C. of not more than 800 kg/m³ is used, the density of the fatty acid alkyl ester phase becomes lower than 1 kg/m³. As a result, separation of the fatty acid alkyl ester phase from the glycerin phase is carried out rapidly. Acetone is an organic solvent which dissolves in a fatty acid alkyl ester and a lower alkyl alcohol and does not dissolve in glycerin. When acetone is used, separation of the fatty acid alkyl ester phase from the glycerin phase is carried out rapidly. Also, by the use of such an organic solvent, yield of the generated fatty acid alkyl ester can be increased since methanol does not dissolve in the generated glycerin. Further, acetone and isopropanol are solvents dissolving in water. Therefore, even if water is contained in the reaction system, the ester exchange can be advanced even without removing water from the reaction system. From this point of view, the use of acetone and isopropanol is preferable as compared with the use of a solvent not dissolving in water such as dimethyl ether and diethyl ether because a step for removing water is not required even though the density at 25° C. of dimethyl ether and diethyl ether is not more than 800 kg/m³.

The above-mentioned catalyst may be any of an alkaline catalyst, an acid catalyst, enzyme, and a solid catalyst comprising an ion exchange resin.

It is preferable that the above-mentioned ester reaction step is a step for mixing the solution comprising the starting oil and the organic solvent with the solution comprising the lower alkyl alcohol and the catalyst. When the mixing is carried out in such a way, a reaction system in a uniformly mixed state can be obtained easily. In addition, the amounts of methanol and catalyst to be used can be decreased.

In the mixing of the above-mentioned solutions, it is preferable that the solution comprising the lower alkyl alcohol and the catalyst is added in multiple stages. If the solution comprising the lower alkyl alcohol and the catalyst is added batchwise, an unreacted lower alkyl alcohol dissolves in the generated glycerin. When the solution comprising the lower alkyl alcohol and the catalyst is added in multiple stages, the added lower alkyl alcohol is used quickly for the ester exchange reaction. Accordingly, dissolution of the lower alkyl alcohol in the generated glycerin can be inhibited. As a result, yield of the fatty acid alkyl ester can be increased.

It is preferable that the above-mentioned starting oil is a vegetable oil.

The method comprises, after completion of the ester exchange reaction step, a step for leaving a reaction solution containing the fatty acid alkyl ester and obtained by the ester exchange reaction step to stand and separating the solution into a fatty acid alkyl ester phase comprising the fatty acid alkyl ester, the lower alkyl alcohol and the organic solvent and a glycerin phase. In the production method of the present invention, the ester exchange reaction quickly occurs by uniformly stirring the starting oil, the lower alkyl alcohol, the organic solvent and the catalyst. When this solution is left to stand, it is quickly separated into the fatty acid alkyl ester phase and the glycerin phase.

The production method of the present invention comprises the step for recovering the lower alkyl alcohol and the organic solvent from the above-mentioned fatty acid alkyl ester phase. According to the production method of the present invention, the lower alkyl alcohol and the organic solvent are contained in the fatty acid alkyl ester phase. The boiling points of the lower alkyl alcohol and the organic solvent are lower than the boiling point of the fatty acid alkyl ester. Therefore, the lower alkyl alcohol and the organic solvent can be easily recovered at the same time by subjecting the fatty acid alkyl ester phase to treatment under reduced pressure or the like.

Also, the recovered lower alkyl alcohol and organic solvent can be added to the solution containing the starting oil and the organic solvent. Accordingly, unreacted lower alkyl alcohol can be used again for the ester exchange reaction, which is efficient.

The system of the present invention for producing the fatty acid alkyl ester comprises the means for generating the fatty acid alkyl ester by carrying out the ester exchange reaction between the starting oil and the lower alkyl alcohol in the homogeneous phase system containing the organic solvent in the presence of the catalyst, and the means for leaving and separating the fatty acid alkyl ester phase containing the fatty acid alkyl ester generated above, the organic solvent and the lower alkyl alcohol from the glycerin phase.

The system may comprise a means for separating the organic solvent and the lower alkyl alcohol from the fatty acid alkyl ester in the fatty acid alkyl ester phase separated by the above-mentioned leaving and separating means. In addition, the system may comprise a means for returning the separated organic solvent and lower alkyl alcohol to the starting oil.

Effect of the Invention

In the method of the present invention for producing the fatty acid alkyl ester, for producing the fatty acid alkyl ester by using a homogeneous phase reaction system, the organic solvent selected from acetone, isopropanol and a mixture thereof is used. As a result, yield of the fatty acid alkyl ester can be made high. In addition, the separation of the fatty acid alkyl ester phase from the glycerin phase can be carried out in an extremely short period of time. Further, since the organic solvent to be used is a liquid at normal temperature, the fatty acid alkyl ester can be produced even without using any special equipment.

BEST MODE FOR CARRYING OUT THE INVENTION

The present invention is explained below in detail. According to the method for treating glycerin of the present invention, glycerin can be treated by the following steps. The method of the present invention for producing the fatty acid alkyl ester is the method for producing the fatty acid alkyl ester by subjecting the starting oil to ester exchange reaction with the lower alkyl alcohol in the presence of a catalyst, and the ester exchange reaction step is carried out in the homogeneous phase system by adding the organic solvent selected from acetone, isopropanol and a mixture thereof to the reaction system.

[Catalyst]

Catalysts usually used in an ester exchange reaction for generating a fatty acid alkyl ester can be used as a catalyst being usable in the present invention. For example, there are exemplified alkaline catalysts such as sodium hydroxide and potassium hydroxide, acid catalysts such as hydrochloric acid, sulfuric acid and hydrogen fluoride, enzyme such as lipase, inorganic substances such as calcium oxide, solid catalysts comprising ion exchange resins such as cation exchange resin and anion exchange resin, and the like. Alkaline catalysts or acid catalysts are used preferably from the viewpoint of production cost. The catalyst may also be used alone or two or more catalysts may be used in combination.

An alkaline catalyst or an acid catalyst may be used in the form of an aqueous solution thereof according to a usual method.

The use of an alkaline catalyst is preferable from the viewpoint of low cost as compared with solid catalysts and from the point of being capable of carrying out esterification reaction at a high speed. On the other hand, when the starting oils and fats contain free fatty acid at a high concentration, in the case of carrying out the esterification reaction of the oils and fats as they are, generation of soap may occur in some cases.

On the other hand, in the case of using an acid catalyst, even when the starting oils and fats contain free fatty acid at a high concentration, esterification reaction proceeds. However, proceeding of the esterification reaction is slow as compared with an alkaline catalyst. Therefore, a catalyst may be selected depending on kind of the starting oils and fats.

The amount of the catalyst to be used in the method of the present invention for producing the fatty acid alkyl ester may be properly adjusted depending on kind of a catalyst to be used, an amount of fatty acid and/or oils and fats in the starting substance, a scale of a reaction system, etc.

3+Concretely the amount of the catalyst may be determined optionally within a range enabling the reaction to be sufficiently carried out without decreasing a speed of the ester exchange reaction and enabling the separation of the catalyst to be conducted in a refining step. For example, when using an alkaline catalyst, the amount of the alkaline catalyst is from 0.03 to 1.0 wt %, preferably from 0.3 to 0.8 wt % based on the starting oil. In the production method of the present invention, even in the case of using such an extremely small amount of catalyst, a sufficient rate of ester exchange reaction can be achieved in a short period of time.

[Starting Oil]

The starting oil to be used in the present invention is not limited particularly as long as it is one containing fatty acid and/or oils and fats. The fatty acid may be any one of saturated fatty acid, unsaturated fatty acid, branched-chain fatty acid, hydroxyl fatty acid and the like. Preferred example includes at least one fatty acid selected from the group consisting of fatty acids of C12 to C28. Preferred examples thereof include lauric acid, myristic acid, pentadecylic acid, palmitic acid, palmitoyl acid, stearic acid, linoleic acid, linolenic acid, arachidonic acid, and the like. The above-mentioned oils and fats are not limited particularly, and may be any one of triglyceride, diglyceride or monoglyceride. Triglyceride is preferable, and more preferred examples include triglycerides in which fatty acid constituting triglycerin is at least one fatty acid selected from the group consisting of fatty acids of C12 to C28. Specific examples of the above-mentioned oils and fats include fatty oil (liquid at normal temperature): vegetable oils (for example, soyabean oil, sesame oil, rapseed oil, rice oil, bran oil, tsubaki oil, safflower oil (oil of *Carthamus tinctorius*), palm oil, palm kernel shell oil, coconut oil, cottonseed oil, sunflower oil, egoma seed oil, olive oil, peanut oil, almond oil, abogado oil, hazel nut oil, walnut oil, grape seed oil, etc.), animal oils (fish oil, liver oil, shark oil, etc.) and fat (solid at normal temperature): lard (pig fat), tallow (beef fat), chicken oil, Schmalz, shortening, butter, margarine, cacao butter, hydrogenated oil, etc. In addition, inedible vegetable oils such as Jatropha and Syring a can also be used as a starting substance. Also, waste oils thereof can be used. Further, those starting oils may be used alone or may be used in a mixture of two or more thereof. Among the above-mentioned starting oils, preferred are fatty oils being a liquid at normal temperature. Especially preferred are vegetable oils (any of edible and inedible oils will do) containing no sulfur (namely, no step for removing sulfur content is required).

In addition to the above-mentioned starting substances in the liquid form, it is possible to use starting substances in the form of solid, gel, sludge, etc. and low quality starting substances such as those containing water and fatty acid at high concentrations can be used in the production method of the present invention by subjecting them to proper pre-treatment. Examples of low quality starting substances include waste oils and fats (including water-containing waste oils and fats) and trap grease (sludge-like substance containing oils and fats and floating on a surface of exhausted water in a grease blocking and collecting device provided upstream of a public sewerage).

Some of the above-mentioned starting oils contain a large amount of free saturated fatty acid (for example, stearic acid, palmitic acid, etc.) (for example, waste fish oils (catfish oil, etc.) or the like). Those oils are usually present in the form of solid, and if they are used as they are in the production method of the present invention, they remain in a final product without having been reacted, which leads to the cause for the engine trouble. In order to separate free saturated fatty acid, oil component is previously extracted by using a solvent (acetone, etc.) to be used in the present invention. In addition, after dissolving an oil component in a solvent, filtration treatment may be carried out according to need to remove free fatty acid.

On the other hand, some of starting oils contain a water soluble reaction-inhibiting substance (for example, saponin, etc.) hindering the execution of the production method of the present invention. For example, Jatropha oil is exemplified as a starting oil containing saponin. Jatropha oil cannot be used as it is for producing a fatty acid alkyl ester. Starting oils containing a water soluble reaction-inhibiting substance may be used for the production method of the present invention after previously removing the water soluble reaction-inhibiting substance. Concretely, the starting oil is rinsed with hot water to previously remove the water soluble reaction-inhibiting substance. In the production method of the present invention, the organic solvent to be used dissolves water. Therefore, even in the case of water-containing starting oils, the production method of the present invention can be carried out without a water removing step.

In the production method of the present invention, the organic solvent is dissolved in water as described infra. Therefore, even in the case of the starting substance being water-containing waste oils and fats, it can be used as it is.

On the other hand, the organic solvent (acetone, isopropanol or a mixture thereof) to be used in the production method of the present invention dissolves not only vegetable oils but also oils and fats. Therefore, when the starting substance contains solids such as fibers, the solids can be removed by dissolving the starting substance in the solvent and then subjecting the resultant solution to filtration or the like.

In the production method of the present invention, the amount of the organic solvent to be used is not limited particularly as mentioned below. Therefore, for a substance not being in the form of liquid (for example, waste oils and fats formed into gel or solidified with a fatty acid based solidifying agent), the organic solvent can be used in an amount sufficient for dissolving such a substance.

[Lower Alkyl Alcohol]

Examples of the lower alkyl alcohol being usable in the present invention include either methanol or ethanol and a mixture thereof prepared by mixing the both at a proper mixing ratio. When the amount of lower alkyl alcohol is too small, not only the speed of the ester exchange reaction is decreased but also a sufficient reaction does not occur. On the other hand, in the present invention, even when the amount of lower alkyl alcohol is larger to a certain extent, unreacted alcohol is separated easily and can be re-used. In the production method of the present invention, even if the amount of lower alkyl alcohol to be used is smaller, the reaction proceeds. Therefore, from the viewpoint of cost, the amount of lower alkyl alcohol is suitably 1 to 1.6 times the stoichiometric ratio to oils and fats, preferably 1 to 1.2 times, more preferably 1 to 1.17 times.

In the above-mentioned Patent Document 3, a starting alcohol is used in a large amount of 1.5 times the stoichiometric ratio or more. In the present invention, even if the amount is an excessive amount of the order of 1.17 times the stoichiometric ratio, a sufficient rate of ester exchange reaction can be executed in a short period of time.

It is the organic solvent that is the most important in the present invention. The organic solvent to be used in the method of the present invention for producing the fatty acid alkyl ester is an organic solvent selected from acetone, isopropanol and a mixture thereof.

Acetone, isopropanol and a mixture thereof are organic solvents being a liquid at normal temperature. Accordingly, in the method of the present invention for producing the fatty acid alkyl ester, the ester exchange can be carried out without a specific temperature control. Therefore, a special reactor is not required for the reaction, which is excellent from the viewpoint of cost.

Acetone (density: 788 $kg/m^3$), isopropanol (density: 781 $kg/m^3$) and a mixture thereof are organic solvents having a density of not more than 800 $kg/m^3$ at 25° C. When an organic solvent having a density of not more than 800 $kg/m^3$ at 25° C. is used, a density of the fatty acid alkyl ester phase becomes smaller than 1 $kg/m^3$. As a result, the separation of the fatty acid alkyl ester phase from the glycerin phase is quickly carried out.

In addition, acetone is an organic solvent being dissolved in the fatty acid alkyl ester and the lower alkyl alcohol but not in glycerin. Accordingly, the fatty acid alkyl ester phase can be easily separated from the glycerin phase.

Also, acetone, isopropanol and a mixture thereof dissolve the starting oil (especially a vegetable oil). Since the starting oil is dissolved, a homogeneous phase system is easily formed. Isopropanol is dissolved in glycerin, but is a preferable solvent. This is because isopropanol dissolves all of the starting materials for the reaction and the reaction products such as the starting oil, fatty acid alkyl ester, lower alkyl alcohol and glycerin, thereby easily maintaining uniformity of the reaction system.

In the production method of the present invention, the adding amount of organic solvent may be not less than 10 wt % based on the starting oil. When the adding amount is less than 10 wt %, an effect of adding the organic solvent cannot be obtained sufficiently. As mentioned above, when using the starting oil being hardly dissolved in the organic solvent, a large amount of organic solvent may be used. Usually the organic solvent may be added in an amount of 10 wt % to 50 wt % based on the starting oil.

[Production Method]

In the method of the present invention for producing the fatty acid alkyl ester, the ester exchange reaction of the starting oil with the lower alkyl alcohol is carried out in the presence of the catalyst in a homogeneous phase system by adding the organic solvent selected from acetone, isopropanol and a mixture thereof to the reaction system.

When using a starting oil containing a small amount of free fatty acid, the fatty acid alkyl ester is produced in the manner mentioned below.

(Mixing Step)

First, the solution comprising the starting oil and the organic solvent is mixed with the solution comprising the lower alkyl alcohol and the catalyst.

The solution comprising the starting oil and the organic solvent is one prepared by mixing at least the starting oil and the organic solvent. The both are dissolved in each other. The mixing ratio of the starting oil to the organic solvent is as mentioned above. The solution comprising the lower alkyl alcohol and the catalyst is a solution prepared by dissolving the alkaline catalyst in the lower alkyl alcohol.

In the present invention, the mixing step is carried out in a vessel having a stirring means. The mixing is carried out by adding the solution comprising the starting oil and the organic solvent and the solution comprising the lower alkyl alcohol and the catalyst in this vessel. Regarding the stirring means, the stirring may be carried out by hand or by using a stirring device, and a known stirring means may be used. The mixing ratio is, for example, 5M of lower alkyl alcohol to 1 mole of triglyceride. In conventional methods, 6M or more of lower alkyl alcohol is mixed to 1 mole of triglyceride. Therefore, in the production method of the present invention, a smaller amount of lower alkyl alcohol as compared with that of conventional method suffices.

The mixing may be carried out to an extent such that the reaction system becomes a homogeneous phase system. Herein, the homogeneous phase system means that a single phase is being formed by the catalyst, organic solvent, fatty acid and/or oils and fats and lower alkyl alcohol.

Herein, "the esterification reaction of the fatty acid and the oils and fats with the lower alkyl alcohol in the homogeneous phase system" means that the reaction system may be in a state of the homogeneous phase system at least at the time when starting the esterification reaction of the fatty acid and the oils and fats with the lower alkyl alcohol. For example, the case of the homogeneous phase system being changed to an unhomogeneous phase system (two phase system) due to glycerin generated as a by-product by the esterification of oils and fats after starting of the esterification reaction is also included in "the esterification reaction of the fatty acid and the oils and fats with the lower alkyl alcohol in the homogeneous phase system" in the present invention. However, in the esterification reaction of oils and fats, it is preferable that the homogeneous phase system is maintained for a long period of time. For that purpose, by introducing a part of the necessary amount of lower alkyl alcohol into the reaction system for the esterification reaction and then introducing additional lower alkyl alcohol, yield of the esterification reaction is improved.

The mixing step is carried out at normal temperature. When an ambient temperature is high, the reaction proceeds rapidly, and generally in the case of 10° C. to 20° C., in the esterification reaction for 2 to 10 minutes, yield thereof is not less than 80%, preferably is close to 100%. When using dimethyl ether or the like, the yield of the reaction is only about 80% in 10 minutes. Thus, in the present invention, the reaction proceeds in a shorter period of time as compared with the case of using a conventional solvent.

As mentioned above, the solution comprising the lower alkyl alcohol and the catalyst can be added in multiple stages. The number of multiple stages is not limited particularly, and in the production method of the present invention, since the reaction time is extremely short, a 2-staged addition suffices. When adding the solution comprising the lower alkyl alcohol and the catalyst in two stages, for example, the mixing is conducted in the first stage to give 3M of lower alkyl alcohol to 1 mole of triglyceride, and in the second stage to give 2M of lower alkyl alcohol to 1 mole of triglyceride.

(Leaving and Separating Step)

By leaving the reaction solution containing a biodiesel fuel obtained in the above-mentioned mixing step, the reaction solution is separated into the fatty acid alkyl ester phase (upper phase) comprising the fatty acid alkyl ester, the lower alkyl alcohol and the organic solvent and the glycerin phase (lower phase). The organic solvent to be used in the present invention dissolves the fatty acid alkyl ester and the lower alkyl alcohol, is not dissolved in glycerin, or has the density smaller than that of the fatty acid alkyl ester. Therefore, the separation of the fatty acid alkyl ester phase (upper phase) from the glycerin phase (lower phase) proceeds very quickly.

Especially when using the organic solvent of the present invention, unreacted lower alkyl alcohol does not dissolve in the glycerin phase, and therefore, nearly pure glycerin can be recovered. Therefore, as compared with the case of using dimethyl ether or the like, it is not necessary to carry out an operation for extracting the lower alkyl alcohol from the glycerin phase.

(Recovering Step)

Next, the lower alkyl alcohol and the organic solvent are recovered from the fatty acid alkyl ester phase. The boiling point of methanol being the lower alkyl alcohol is 64.7° C., and the boiling point of ethanol is 78.4° C. The boiling point of acetone being the organic solvent is 56.5° C., and the boiling point of isopropanol is 82.4° C. Therefore, the lower alkyl alcohol and the organic solvent can be easily recovered by distillation or distillation under reduced pressure of the fatty acid alkyl ester phase. Thus, the high purity fatty acid alkyl ester can be easily obtained.

The lower alkyl alcohol and the organic solvent recovered above can be added to the solution comprising the starting oil and the organic solvent without being separated. In usual ester exchange reaction, it is required to use chemical products having high purity. On the other hand, in the production method of the present invention, the ester exchange reaction can be carried out at good yield even if purity is not high. Since a step for separating the lower alkyl alcohol and the organic solvent is not necessary, a production cost can be reduced. In addition, it is easy to re-use the organic solvent and the unreacted lower alkyl alcohol.

In the case of the starting oil being one containing free fatty acid (excluding one containing oils and fats) or one containing free fatty acid and oils and fats, it is preferable to previously carry out esterification of the free fatty acid by carrying out the above-mentioned reaction using an acid catalyst as a catalyst and subjecting the free fatty acid in a fatty acid-containing oil (excluding one containing oils and fats) to esterification in a homogeneous phase system into a lower alkyl ester (pre-treatment). It is preferable to optionally carry out the pre-treatment of the starting oil. For example, in the case of low quality waste oils and fats, 40 to 100% of free fatty acid is contained therein, and therefore, when using such waste oils and fats as the starting oil, it is essential to carry out the pre-treatment.

One of the reasons for carrying out the reaction with an acid catalyst in the pre-treatment as mentioned above is that when subjecting free fatty acid to an ester exchange reaction directly by an alkali catalyst method, the free fatty acid reacts with the lower alkyl alcohol in the presence of an alkaline catalyst, and an alkali metal salt (soap) of fatty acid and water are generated without generating a fatty acid alkyl ester (biodiesel fuel).

Also, in the above-mentioned ester exchange reaction, an acid catalyst can be used instead of an alkaline catalyst. In this case, yield of the ester exchange reaction decreases more in the case of using an acid catalyst.

A high quality biodiesel fuel solution can be obtained by washing the obtained fatty acid alkyl ester with water or warm water and dehydrating it. In addition, glycerin generated as a by-product can be used.

EXAMPLE

The present invention is explained in detail by means of examples, but the present invention is not limited to such examples.

In the following Experimental Examples, yield of fatty acid methyl ester is determined by leaving a solution obtained after a lapse of each reaction time and then collecting an upper phase of the solution to measure a concentration of fatty acid methyl ester with a high performance liquid chromatography.

Experimental Example 1

Waste Oil+Alkaline Catalyst

Waste oil collected by Sakai City was used as waste oil. A reaction was carried out under the following conditions. To a solution of a mixture of waste oil (40 parts by weight) and a solvent (20 parts by weight) was mixed a solution of a mixture of KOH (0.5% (to waste oil)) and methanol (5 times the amount of oil, oil:methanol=1:5) with stirring. The reaction temperature was 15° C. The yields in the case of using no solvent was evaluated as control, and acetone and isopropanol were used as solvents for Examples, and tetrahydrofuran, ethyl ether, ethyl acetate, acetonitrile, dimethyl sulfoxide and dioxane were used as solvents for Comparative Examples. Yields of fatty acid methyl esters of each reaction system after a lapse of 30 sec, 1 min, 2 min, 5 min. 10 min and 1 hour, respectively were determined. The results are shown in Table 1, FIG. 1 and FIG. 2.

Tetrahydrofuran is a solvent having a density at 25° C. of 889 kg/m$^3$. Ethyl ether is a solvent which does not dissolve in water and when using ethyl ether, methanol dissolves in glycerin generated. Ethyl acetate is a solvent having a density at 25° C. of 897 kg/m$^3$. Acetonitrile does not dissolve in a fatty acid alkyl ester. Dimethyl sulfoxide is a solvent having a density at 25° C. of 1,100 kg/m$^3$. Dioxane is a solvent having a density at 25° C. of 1,033 kg/m$^3$.

TABLE 1

| Solvent | Reaction time | | | | | |
|---|---|---|---|---|---|---|
| | 30 sec | 1 min | 2 min | 5 min | 10 min | 1 hr |
| No solvent used | 0 | 12.5 | 23.8 | 34.8 | 48.2 | 52.3 | 68.3 |
| Acetone | 0 | 38.3 | 53 | 67.2 | 82.9 | 88.3 | 98.2 |
| Isopropanol | 0 | 37 | 52.6 | 65.3 | 77.2 | 85.3 | 95.2 |
| Tetrahydrofuran | 0 | 33.5 | 50.4 | 61.5 | 73.7 | 75.3 | 82.7 |
| Ethyl ether | 0 | 39.7 | 41.3 | 54.8 | 70.2 | 77.9 | 84.3 |
| Ethyl acetate | 0 | 34.8 | 41.1 | 47.9 | 54.3 | 58 | 69.8 |
| Acetonitrile | 0 | 13.5 | 24.2 | 35.3 | 63.2 | 68.7 | 72.3 |
| Dimethyl sulfoxide | No reaction occurred until a lapse of 30 min | | | | | |
| Dioxane | No reaction occurred until a lapse of 30 min | | | | | |

FIG. 1 is a graph showing yields of fatty acid methyl esters during the period of time from starting of the reaction until a lapse of 12 minutes when using, as an organic solvent, acetone, isopropanol, tetrahydrofuran, ethyl ether, ethyl acetate and acetonitrile. FIG. 2 is a graph showing yields of fatty acid methyl esters during the period of time from starting of the reaction until a lapse of 60 minutes when using, as an organic solvent, acetone, isopropanol, tetrahydrofuran, ethyl ether, ethyl acetate and acetonitrile. In FIGS. 1 and 2, the abscissa axis represents a period of time (min) elapsed after starting of the reaction, the ordinate axis represents yields (%) of fatty acid methyl esters, ○ represents nonuse of a solvent, ● represents acetone, □ represents isopropanol, ■ represents tetrahydrofuran, Δ represents ethyl ether, ▲ represents ethyl acetate, and ◇ represents acetonitrile.

From Table 1 and FIG. 1, it is seen that in the case of using acetone and isopropanol as an organic solvent, the fatty acid methyl esters were generated at yield as high as more than 85% during the period of time from starting of the reaction until a lapse of 12 minutes, and by the 1-hour reaction, the fatty acid methyl esters were generated at yield of nearly 100%. On the other hand, in the case of using tetrahydrofuran and ethyl ether as an organic solvent for Comparative Examples, the fatty acid methyl esters were generated at yield of around 75% during the period of time from starting of the reaction until a lapse of 12 minutes, and by the 1-hour reaction, the fatty acid methyl esters were generated at yields of 82.7% and 84.3%, respectively, which indicates that these yields of the fatty acid methyl esters are inferior as compared with the case of using acetone and isopropanol.

Experimental Example 2

The reaction was carried out in the same manner as in Experimental Example 1 using acetone and isopropanol except that methanol was added in an amount of 3 times the amount of waste oil and after a lapse of 2 minutes, methanol was added in an amount of 2 times the amount of waste oil. The results are shown in Table 2. Table 2 shows the yields (%) of the fatty acid methyl esters in a period of time (min) elapsed after starting of the reaction.

TABLE 2

| Elapsed Time (min) | 1 min | 2 min | 5 min | 10 min |
|---|---|---|---|---|
| Acetone (Yield %) | 53.2 | 68.3 | 92.4 | 98.3 |
| Isopropanol (Yield %) | 52.8 | 67.8 | 87.3 | 97.5 |

From Table 2, it is seen that in the case of adding methanol in 2 stages, the fatty acid methyl esters were generated at yields of 92.4% and 87.3% at the time when 5 minutes has elapsed after starting of the reaction, and that the yields are very good as compared with the addition of methanol in one stage.

Experimental Example 3

Free Fatty Acid+Acid Catalyst

To a solution of a mixture of free fatty acid (oleic acid) (20 parts by weight) and a solvent (20 parts by weight) was mixed a solution of a mixture of sulfuric acid (1 part by weight (to waste oil)) and methanol (4.5 parts by weight based on oil, oleic acid:methanol=1:2) with stirring. The reaction temperature was 15° C. The yields in the case of using no solvent was evaluated as control, and acetone and isopropanol were used as solvents for Examples, and tetrahydrofuran, ethyl ether, ethyl acetate, acetonitrile, dimethyl sulfoxide and dioxane were used as solvents for Comparative Examples. Yields of fatty acid methyl esters of each reaction system after a lapse of 30 min, 1 hr (60 min), 2 hr (120 min), 5 hr (300 min) and 10 hr (600 min), respectively were determined. The results are shown in Table 3 and FIG. 3.

TABLE 3

| Solvent | Reaction time | | | | |
|---|---|---|---|---|---|
| | 30 min | 1 hr | 2 hr | 5 hr | 10 hr |
| No solvent used | 0 | 13.4 | 17.15 | 20.7 | 32.4 | 39.5 |
| Acetone | 0 | 26 | 36.5 | 42.5 | 54.5 | 70.1 |
| Isopropanol | 0 | 24.1 | 35.9 | 41.5 | 55.3 | 70.9 |
| Tetrahydrofuran | 0 | 18.4 | 24.6 | 28.3 | 42.1 | 55.4 |
| Ethyl ether | 0 | 16.1 | 18.9 | 24.6 | 38.3 | 48.2 |

FIG. 3 is a graph showing yields of fatty acid methyl esters during the period of time from starting of the reaction until a lapse of 600 minutes when using sulfuric acid as a catalyst and using, as an organic solvent, acetone, isopropanol, tetrahydrofuran and ethyl ether. In FIG. 3, the abscissa axis represents a period of time (min) elapsed after starting of the reaction, the ordinate axis represents yields (%) of fatty acid methyl esters, ○ represents nonuse of a solvent, ● represents acetone, □ represents isopropanol, ■ represents tetrahydrofuran, and Δ represents ethyl ether.

From FIG. 3 and Table 3, it is seen that in the case of using acetone and isopropanol as a solvent, the fatty acid methyl esters were generated at yield of about 70% by the 10-hour (600 min) reaction. On the other hand, in the case of using tetrahydrofuran as a solvent for Comparative Example, the yield was 55.4%, and in the case of using ethyl ether as a solvent for Comparative Example, the yield was 48.2%, which indicates that these yields of the fatty acid methyl esters are inferior.

From the results mentioned above, it is seen that when using acetone and isopropanol which are used in the production method of the present invention, fatty acid methyl esters are generated at high yield in a short period of time even if either of an alkaline catalyst and an acid catalyst is used.

Experimental Example 4

Waste fish oil (catfish oil) comprising 4.6% of stearic acid and 7.3% of palmitic acid as a free saturated fatty acid was used as a starting oil. First, to the waste fish oil (catfish oil) was added acetone in an amount of 25 vol % to the oil to dissolve the oil content. The solution (acetone solution of oil) from which the free saturated fatty acid being a solid content had been removed was subjected to reaction in the presence of methanol in an amount of 4.5 times the amount of the oil content and 0.5 wt % of a KOH catalyst, and within ten minutes, the fatty acid methyl ester was generated at yield of not less than 97%.

Comparative Experimental Example 1

Waste fish oil (catfish oil) from which free saturated fatty acid had not been removed was used as the starting oil and treated in the same manner as above, and fatty acid methyl ester was not generated.

Experimental Example 5

Jatropha oil was washed with warm water to remove saponin being soluble in water. The washing was carried out twice by using water in an amount of 50% to the oil. Acetone was added to the remaining oil, and in the presence of methanol in an amount of 4.5 times that of the oil and 0.5% of a KOH catalyst, the fatty acid methyl ester was generated at yield of not less than 97% within ten minutes. In this Experiment Example, water was not removed, and the fatty acid methyl ester was generated at high yield.

Comparative Experimental Example 2

Jatropha oil from which saponin had not been removed was used as the starting oil and treated in the same manner as above, and fatty acid methyl ester was not generated.

Experimental Example 6

To domestic waste oil derived from vegetable were added acetone in an amount of 25% to the oil, methanol in an amount of 4.5 times that of the oil and a KOH catalyst in an amount of 0.5% to the oil, followed by the same treatment as above. By the 5-minute reaction, the fatty acid methyl ester was generated at yield of not less than 97%. From this Experimental Example, it is seen that the fatty acid methyl ester is generated at high yield even without a specific pre-treatment of waste oil.

From the above-mentioned Experimental Examples 4 and 5, it is seen that starting oils containing a substance hindering the reaction may be subjected to proper pre-treatment. In addition, it is seen that the production method of the present invention can be applied to waste oils.

Figure 1:
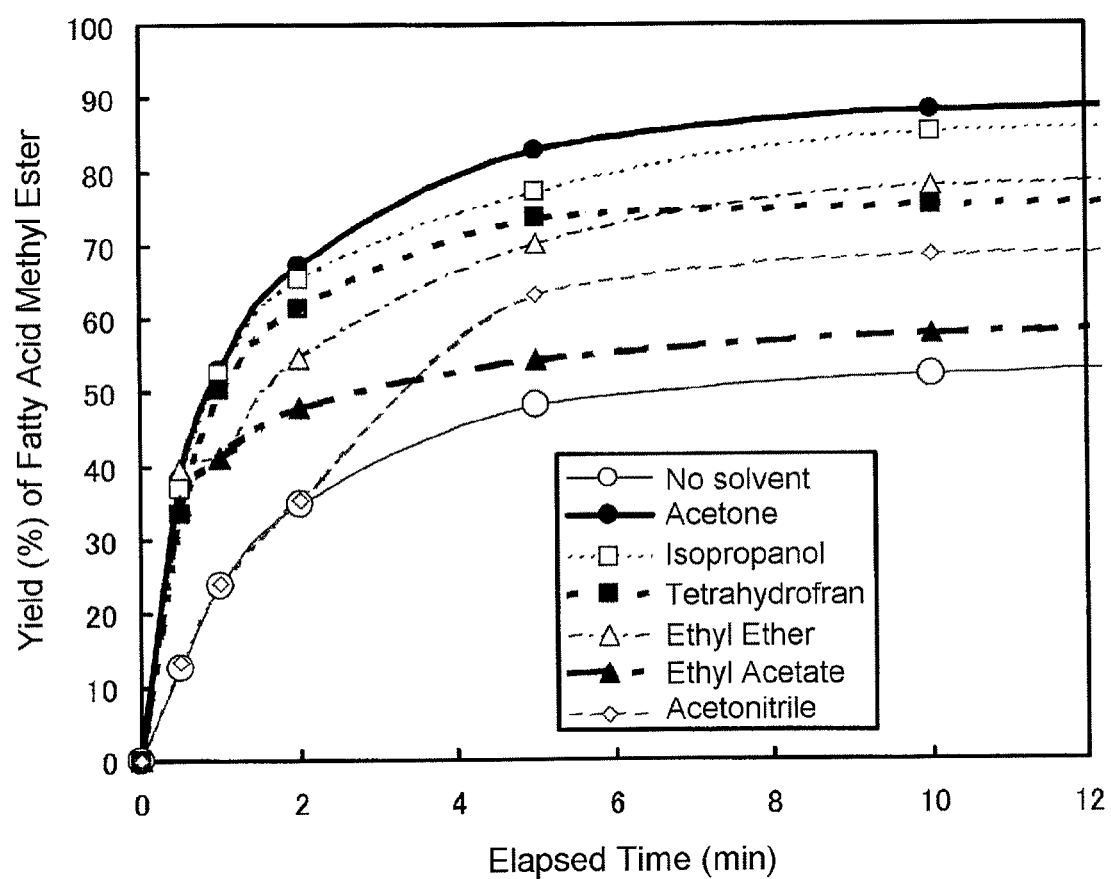
FIG. 1 is a graph showing yields of fatty acid methyl esters during the period of time from starting of the reaction until a lapse of 12 minutes when using, as an organic solvent, acetone, isopropanol, tetrahydrofuran, ethyl ether, ethyl acetate and acetonitrile.
Figure 2:
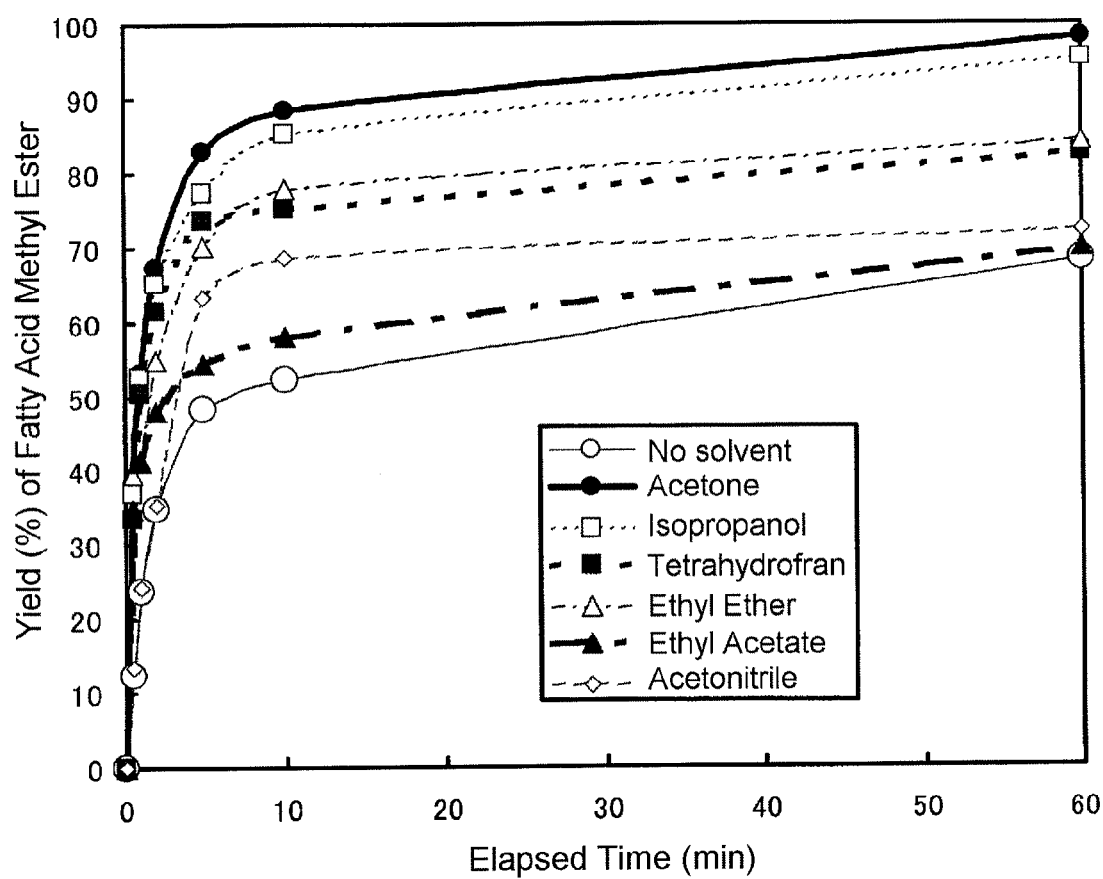
FIG. 2 is a graph showing yields of fatty acid methyl esters during the period of time from starting of the reaction until a lapse of 60 minutes when using, as an organic solvent, acetone, isopropanol, tetrahydrofuran, ethyl ether, ethyl acetate and acetonitrile.
Figure 3:
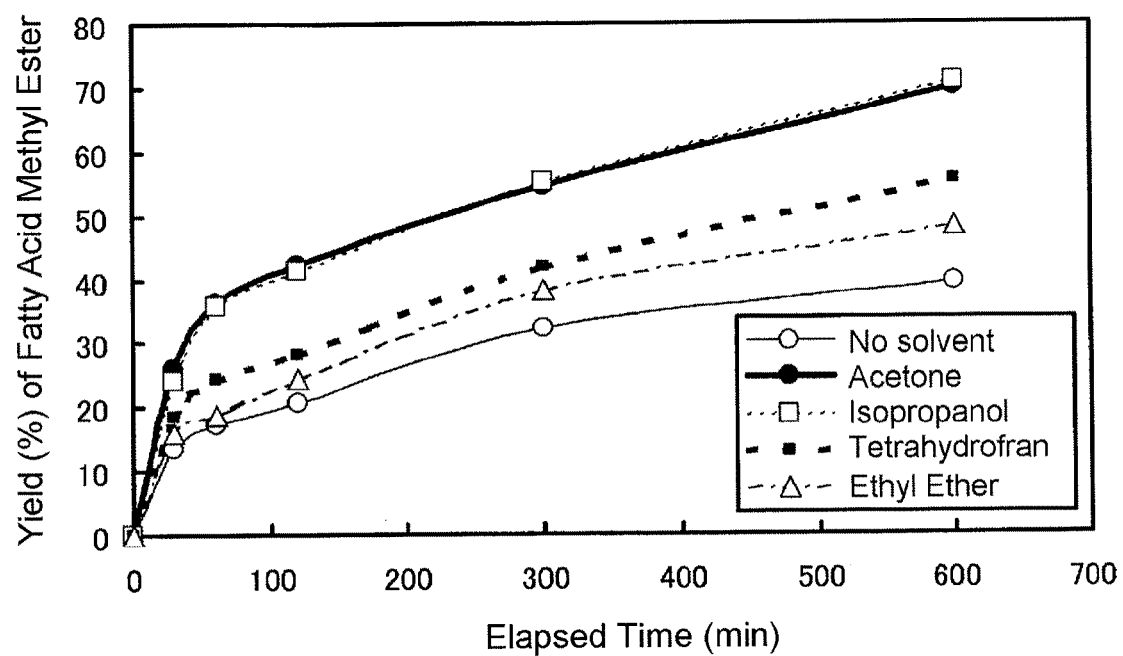
FIG. 3 is a graph showing yields of fatty acid methyl esters during the period of time from starting of the reaction until a lapse of 600 minutes when using sulfuric acid as a catalyst and using, as an organic solvent, acetone, isopropanol, tetrahydrofuran and ethyl ether.

The invention claimed is:

1. A method for producing a fatty acid alkyl ester comprising subjecting a starting oil to an ester exchange reaction with a lower alkyl alcohol in the presence of a catalyst to generate a fatty acid alkyl ester, wherein said ester exchange reaction step is carried out in a homogeneous phase system by adding an organic solvent selected from acetone, isopropanol and a mixture thereof to a reaction system.

2. The method for producing a fatty acid alkyl ester according to claim 1, wherein said starting oil is a vegetable oil.

3. The method for producing a fatty acid alkyl ester according to claim 1, wherein said catalyst is any one of an alkaline catalyst, an acid catalyst, an enzyme or a solid catalyst comprising an ion exchange resin.

4. The method for producing a fatty acid alkyl ester according to claim 1, wherein said ester exchange reaction step is a step for mixing a solution comprising the starting oil and the organic solvent with a solution comprising the lower alkyl alcohol and the catalyst.

5. The method for producing a fatty acid alkyl ester according to claim 4, wherein said mixing of the solutions is carried out by adding the solution comprising the lower alkyl alcohol and the catalyst in multiple stages.

6. The method for producing a fatty acid alkyl ester according to claim 1, comprising, after completion of said ester exchange reaction step, a leaving and separating step for leaving a reaction solution containing the fatty acid alkyl ester and obtained by the ester exchange reaction step to separate the solution into a fatty acid alkyl ester phase comprising the fatty acid alkyl ester, the lower alkyl alcohol and the organic solvent and a glycerin phase.

7. The method for producing a fatty acid alkyl ester according to claim 1, comprising a step for recovering the lower alkyl alcohol and the organic solvent from the fatty acid alkyl ester phase.

8. The method for producing a fatty acid alkyl ester according to claim 7, wherein the recovered lower alkyl alcohol and organic solvent are added to the solution comprising the starting oil and the organic solvent.

* * * * *